US012339349B1

(12) United States Patent
Passler et al.

(10) Patent No.: US 12,339,349 B1
(45) Date of Patent: Jun. 24, 2025

(54) DUAL ROUND TRIP TIME MITIGATION FOR WIRELESS LOCAL AREA NETWORK DEVICES

(71) Applicant: SR Technologies, Inc., Sunrise, FL (US)

(72) Inventors: Mark Passler, Rockville, MD (US); Kyle Patrick Kelly, Palm Beach Gardens, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/984,635

(22) Filed: Dec. 17, 2024

Related U.S. Application Data

(63) Continuation of application No. 18/753,241, filed on Jun. 25, 2024, now Pat. No. 12,181,564.

(60) Provisional application No. 63/612,701, filed on Dec. 20, 2023.

(51) Int. Cl.
| | |
|---|---|
| *G01S 13/76* | (2006.01) |
| *H04W 56/00* | (2009.01) |
| *H04W 64/00* | (2009.01) |

(52) U.S. Cl.
CPC ......... *G01S 13/76* (2013.01); *H04W 56/0055* (2013.01); *H04W 64/00* (2013.01)

(58) Field of Classification Search
CPC .... G01S 13/76; H04W 56/0055; H04W 64/00
See application file for complete search history.

(56) References Cited

U.S. PATENT DOCUMENTS

| | | | |
|---|---|---|---|
| 9,237,546 B1* | 1/2016 | Zhang | H04W 4/02 |
| 9,445,227 B2* | 9/2016 | Aldana | H04W 24/10 |
| 10,064,154 B2* | 8/2018 | Banin | G01S 5/10 |
| 11,119,206 B2* | 9/2021 | Amizur | H04W 64/00 |
| 2017/0261591 A1* | 9/2017 | Zhang | G01S 13/76 |
| 2020/0158852 A1* | 5/2020 | Passler | G01S 13/86 |
| 2020/0166630 A1* | 5/2020 | Passler | H04W 64/00 |
| 2020/0225673 A1* | 7/2020 | Ebrahimi Afrouzi | A47L 11/4011 |
| 2023/0239671 A1* | 7/2023 | Nevipur | H04W 4/90 455/404.2 |
| 2023/0413208 A1* | 12/2023 | Cho | H04W 56/001 |

* cited by examiner

*Primary Examiner* — Peter M Bythrow
(74) *Attorney, Agent, or Firm* — Goodwin Procter LLP

(57) ABSTRACT

A method and devices are disclosed for geo-location of wireless local area network (WLAN) devices. According to one aspect, a method for determining a corrected round trip times (RTT) resulting from communication with a WD is provided. The WD is configured with one or two short interframe spacings (SIFS). The method includes performing RTT measurements at successive times. The method includes determining a presence of one or two modes based at least in part on peaks of a kernel density estimation (KDE) surface. The KDE surface is determined from the RTT measurements. When there is only one mode, a corrected RTT is determined based on the RTT measurements and a first SIFS. When there are two modes, a corrected RTT is determined based on the RTT measurements and the first SIFS plus an SIFS offset ($\Delta$), $\Delta$ being based at least in part on a difference between the two modes.

20 Claims, 12 Drawing Sheets

DUAL ROUND TRIP TIME MITIGATION FOR WIRELESS LOCAL AREA NETWORK DEVICES

CROSS-REFERENCE TO RELATED APPLICATION

This application claims priority to and benefit of U.S. patent application Ser. No. 18/753,241, filed Jun. 25, 2024, which claims priority to and benefit of U.S. Provisional Patent Application Ser. No. 63/612,701, filed Dec. 20, 2023, the entire disclosure of each of which is hereby incorporated by reference.

TECHNICAL FIELD

The present disclosure relates to geo-location of wireless devices, and in particular to a method, device, and system for the geo-location of wireless local area network (WLAN) devices.

BACKGROUND

Initially, it is noted that IEEE Standard 802.11-2020 is used as the base reference for disclosures made herein, the entire contents of which are incorporated herein by reference. The IEEE 802.11-2020 Standard is commonly referred to as "Wi-Fi" and is referred to as such herein.

The location of wireless devices may be determined by various methods. These methods may be classified as active, passive and combined active and passive. In an active location scheme, a device that is determining the location or range, the measuring station, transmits certain packets to the device being located, i.e., the target station, and a common method is to measure the time of arrival (TOA) of the response packet from the target device and compare that to the time of departure (TOD) of the request packet that was transmitted by the measuring device so as to determine the round trip time (RTT).

In an active location scheme, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example, a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the propagation time, td, between the measuring station and the target station, may be determined from the calculation: $td=(TOA-TOD-SIFS)/2$ and the distance between the measuring station and the target station is then $td*c$, where c is the speed of light. This method of estimating the distance to a target station by measuring the TOD and TOA and accounting for the turnaround time is known.

FIG. 1 is a diagram of a typical location system 100 which includes three wireless measuring stations 110a, 110b and 110c (referred to collectively herein as "wireless measuring stations" or "wireless measuring receivers" 110). The target station 120 may be a wireless device, such as, for example, an Access Point (AP) that is to be located by the three mobile measuring stations 110. The distance of the target station 120 from measuring station 110a is D1, 130. The distance of the target station 120 from wireless measuring station 110b is D2, 140. The distance of the target station 120 from wireless measuring station 110c is D3, 150. The time of flight, TOF, determined from the calculation $TOF=(TOA-TOD-SIFS)=RTT-SIFS$, is measured for transmissions from wireless measuring station 110a and this may be used to calculate the distance D1 130 using the formula $D1=TOF1*c/2$, where c is the speed of light. Similarly, TOF2 and TOF3 measurements result in the determination of distances D2 140 and D3 150. The methods for calculating the location of target station 120 using the distances D1 130, D2 140 and D3 150 are well known.

It has been observed that a number of Wi-Fi Access Points do not use the SIFS value defined in the Standard, and furthermore may use more than one SIFS value. In the general sense, it has been observed that a significant number of Wi-Fi Access Points use two SIFS values and randomly switch between them. If the SIFS value is changing, then the measured RTT will vary with the change in SIFS value. This varying RTT value must be mitigated in order to accurately calculate the location using RTT measurements.

SUMMARY

Some embodiments are direct to methods and devices for the geo-location of wireless local area network (WLAN) devices According to one aspect, a method in a first wireless device (WD) for determining a corrected round trip times (RTT) resulting from communication with a second WD is provided, where the second WD is configured with one or two short interframe spacings (SIFS). The method includes performing a plurality of RTT measurements ($RTT_i$) at successive times during a time period, T. The method also includes determining a presence of one or two modes based at least in part on peaks of a kernel density estimation (KDE) surface, the KDE surface being determined from the plurality of RTT measurements. When there is only one mode, then a corrected RTT is determined based at least in part on the plurality of RTT measurements and a first SIFS. When there are two modes, a corrected RTT is determined based at least in part on the plurality of RTT measurements and the first SIFS plus an SIFS offset ($\Delta$), $\Delta$ being based at least in part on a difference between the two modes.

According to another aspect, a first wireless device (WD) is configured to determine a corrected round trip time (RTT) resulting from communication with a second WD, where the second WD is configured with one or two short interframe spacings (SIFS). The first WD is configured to: perform a plurality of RTT measurements ($RTT_i$) at successive times during a time period, T; and determine a presence of one or two modes based at least in part on peaks of a kernel density estimation (KDE) surface, the KDE surface being determined from the plurality of RTT measurements. When there is only one mode, a corrected RTT is determined based at least in part on the plurality of RTT measurements and a first SIFS. When there are two modes, a corrected RTT is determined based at least in part on the plurality of RTT measurements and the first SIFS plus an SIFS offset (Δ), Δ being based at least in part on a difference between the two modes.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

In one embodiment of the present disclosure, a single, mobile wireless measuring station 110 is used. Wireless measuring station 110 may be ground based or airborne. The present disclosure provides methods and devices that detect the presence of a target station 120 that has dual SIFS values, i.e., SIFS modes, causing dual RTT values. The time difference between the modes is identified and then used in the minimization of the difference between the measured RTT and the TOF calculation, where the calculated TOF is twice the propagation time for a packet to be sent between the wireless measuring station 110 and the estimated location of the target station 120.

Figure 2:
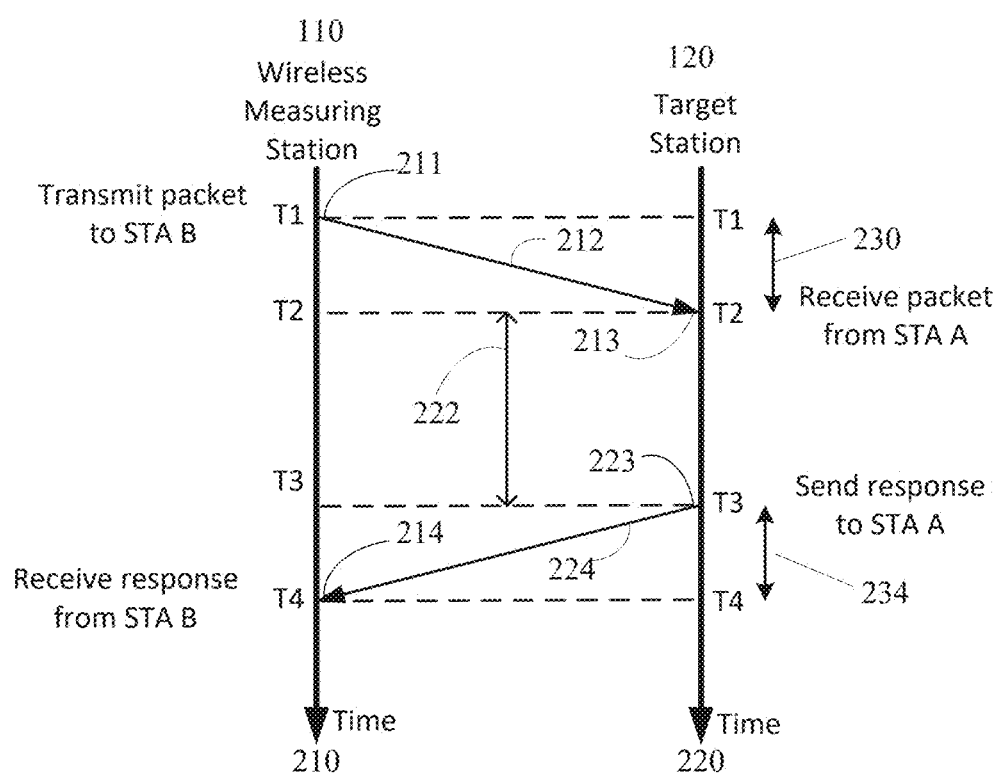
FIG. 2 is a timing diagram that describes a ranging method of the present disclosure that may be used to determine the distance between two wireless devices, such as wireless measuring station and target station.

Referring again to the drawing figures in which like reference designators refer to like elements, there is shown in FIG. 2 a timing diagram that describes a ranging method of the present disclosure that may be used to determine the distance between two wireless devices, such as wireless measuring station 110 and target station 120. Time axis 210 refers to the time axis for wireless measuring station 110 and time axis 220 refers to the time axis for target station 120. At time T1 211, wireless measuring station 110 transmits a ranging packet 212 to target station 120. This ranging packet 212 transmission is received at target station 120 at time T2 213. The propagation time of the ranging packet 212 transmission is (T2−T1) 230. Target station 120 transmits a response packet 224 at time T3 223. The time 222 that has elapsed between the reception of the packet at time T2 213 and the transmission at time T3 223 is the turnaround time at wireless target station 120. Ideally, the turnaround time 222 at STA B will be equal in duration to SIFS. At time T4 214, wireless measuring station 110 receives the response packet 224 from target station 120. The propagation time of the transmission of the response packet 224 is (T4−T3) 234. It should be noted that the time differences 230 (T2−T1) and 234 (T4−T3) represent the propagation time, td, of the transmissions and should be equal, assuming the distance between the two stations has not changed. The total time, RTT, that elapses between the transmission of ranging packet 212 and the response packet 224 at wireless measuring station 110 is:

$$RTT=(T2-T1)+(T3-T2)+(T4-T3)=(T4-T1)=td+\text{SIFS}+td \quad (1)$$

Hence, $RTT=(T4-T1-\text{SIFS})$ $$RTT=2\ td+\text{SIFS or RTT}=\text{TOF}+\text{SIFS} \quad (2)$$

Equation (2) is a simplified equation that is included to provide an understanding of the basic concept of the ranging transmission method. Note that the duration of the transmitted packet and the response packet is not accounted for in equation (2). Note also that in practice, it is common that the timestamp of a packet is set to coincide with the end of the packet at the point where the frame check is completed.

Figure 3:
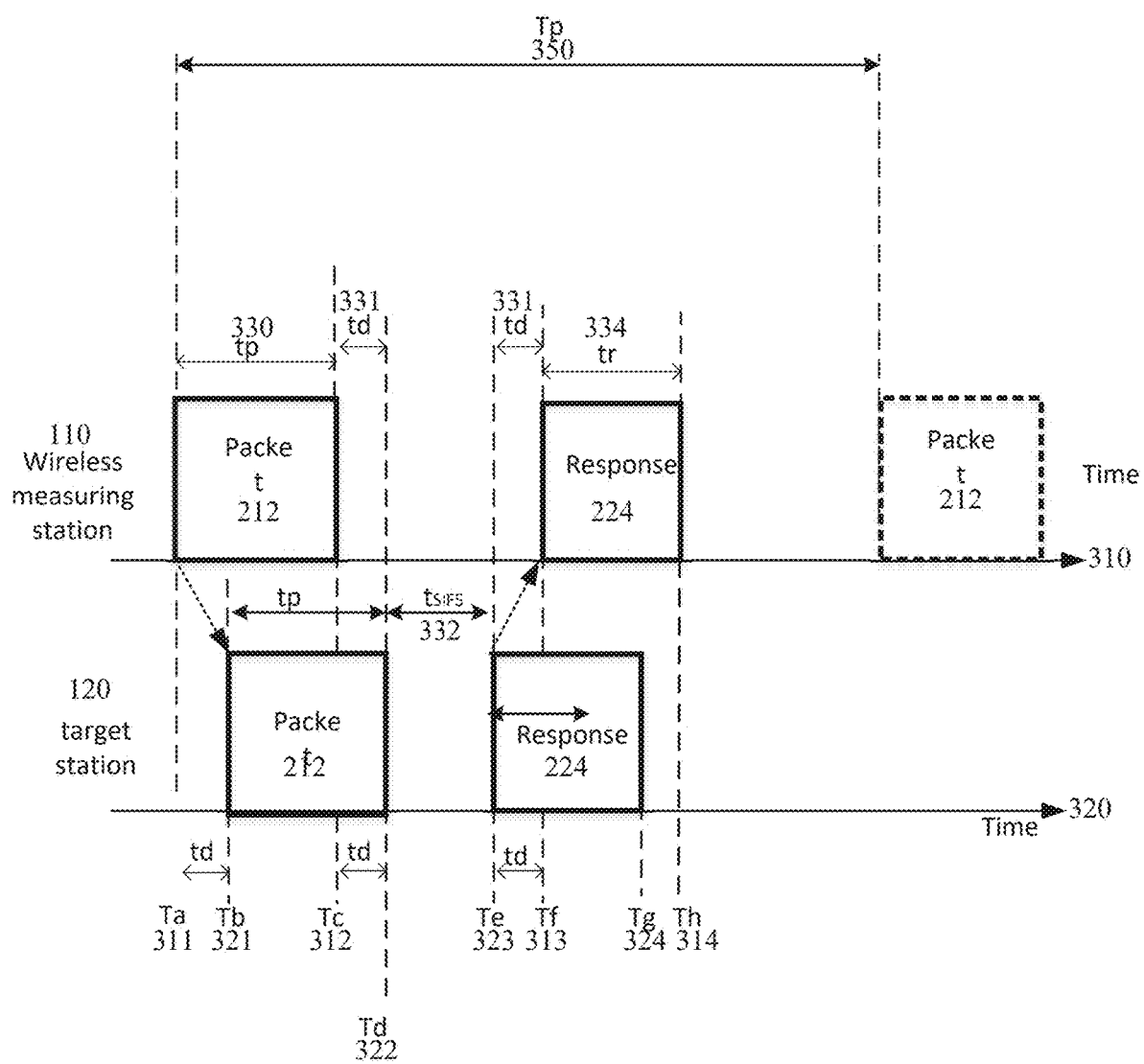
FIG. 3 is a timing diagram that describes in further detail the ranging transmission method.

FIG. 3 is an example timing diagram that describes in further detail the ranging transmission method. Time axis 310 is the time axis for wireless measuring station 110 and time axis 320 is the time axis for target station 120. At time Ta 311, wireless measuring station 110 starts the transmission of ranging packet 212 which is addressed to target station 120. After a time-delay of td, at time Tb 321, target station 120 starts to receive ranging packet 212. At time Tc 312, wireless measuring station 110 completes the transmission of ranging packet 212 and at time Td 322, wireless target station 120 completes the reception of ranging packet 212. The time difference between Tc 312 and Td 322 is td, the propagation time for the packet to travel from wireless measuring station 110 to target station 120. Note that the time differences (Tc−Ta) and (Td−Tb) are both equal to the duration tp 330 of the transmitted ranging packet 212.

Target station 120 transmits the response packet 224 at time Te 323. Assuming that the response packet 224 is an ACK or an RTS packet in reply to the received ranging packet 212, time Te 323 ideally will be at a time $t_{SIFS}$ 332 after time Td 322, where $t_{SIFS}$ 332 is the SIFS time as defined in the IEEE 802.11 standard. At time Tf 313, wireless measuring station 110 starts to receive the response packet 224. At time Tg 324, target station 120 completes the transmission of the response packet 224 and at time Th 314, wireless measuring station 110 completes receiving the response packet 224. Note that the time differences (Tb−Ta), (Td−Tc), (Tf−Te) and (Th−Tg) are all equal and have the value td which is the propagation time for the ranging packet and response packet to travel between the two stations.

At wireless measuring station 110, the time of a packet at the point when the frame check has completed, may be recorded. Hence, the time for the transmission TOD of ranging packet 212 that is recorded is Tc 312, and the time that is recorded for the reception TOA of the response packet 224 is Th 314. In order to calculate the value of td, it is desirable to know the duration tr 334 of the response packet 224. Calculating the duration tr 334 is straightforward, as the wireless measuring station 110 may monitor the details of the response packet such as data rate and length. In practice, therefore, wireless measuring station 110 may measure the RTT from equation (3):

$$RTT = Th - Tc - tr \quad (3)$$

And may calculate the value of td from expression (4):

$$td = (RTT - tSIFS)/2 \quad (4)$$

and hence the corresponding distance: $D = td * c$     (5)

Ranging packets 212 may be transmitted either continuously or in bursts separated by time Tp 350.

Figure 4:
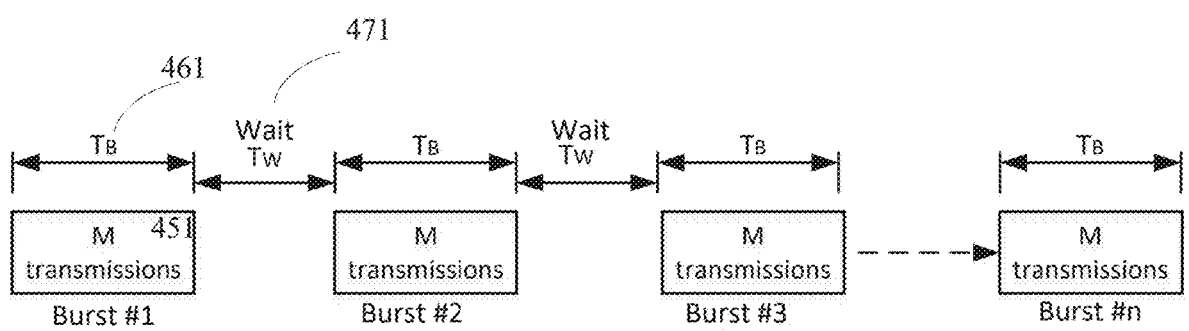
FIG. 4 is an example timing diagram of a series of bursts of transmissions of the ranging packets.

FIG. 4 is an example timing diagram of a series of bursts of transmissions of the ranging packets 212. In one embodiment of this disclosure, a "burst", 451, consisting of a preset number M of transmissions of packets 212 from wireless measuring station 110, may be sent followed by a "wait" period, Tw 471. This sequence may continue until a command may be issued to terminate the transmissions. Within each burst, each of the M transmissions may be separated by a preset time, Tp 350. The duration TB 461 of each burst will therefore be N Tp. For example, a burst may consist of 64 transmissions of packets 212 from wireless measuring station 110, each transmission, say, 1 ms apart, followed by a wait period of, say, 30 ms after which another burst of 64 transmissions may be sent. In this example, the duration of each burst will be 64 ms.

Figure 1:
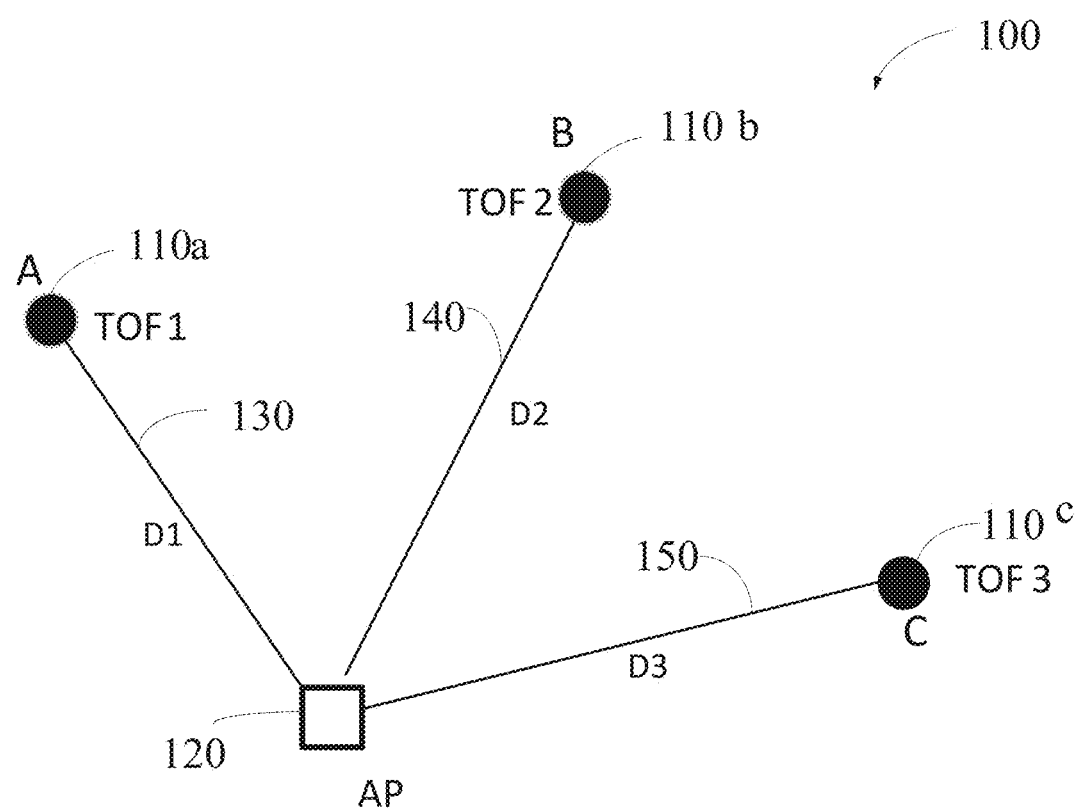
FIG. 1 is a diagram of a typical location system which includes three wireless measuring stations.

In the case that there is a single wireless measuring station 110, as may be the case when the station is mobile or even airborne, then, as depicted in FIG. 1, the three measuring distances D1 130, D2 140 and D3 150 will be taken at different points in time. In this case, the wireless measuring station 110 may be moving over an area and periodically transmitting ranging packets 212, receiving the response packets 224, determining the RTTs and calculating the corresponding delay times td. Over time, the location of wireless target station 120 may be calculated with increasing accuracy as more measurements are taken by the airborne wireless measuring station 110 from varying positions. Such calculations are well known.

As mentioned previously, the packet exchange may be any pair of packets where an automatic response packet is sent. Commonly used packets in Wi-Fi include an RTS/CTS exchange and a Data (null)/Ack exchange.

From equation (3):

$$RTT = 2td + t_{SIFS} \quad (5)$$

where td is the propagation time 331

RTT measurements, in the general sense, will exhibit variations due to noise, in the case of weak signal strengths, and, in part, the timing accuracy of the clock at target station 120 and the timing accuracy of the clock at wireless measuring station 110. Also, as discussed above, the turnaround time $t_{SIFS}$ 332 may not be constant, or indeed equal to the SIFS value specified in the Standard.

In order to derive an estimated position for target station 120, the determination of a best fit to the RTT measurements is required. A more complete understanding of the present disclosure, and the attendant advantages and features thereof, will be more readily understood by first describing the classical method for fitting the RTT measurements to a target position by use of minimization of the summation of the squared residuals (SSR). The method for fitting the RTT measurements to a target position by use of minimization of the summation of the squared residuals (SSR) is known to one skilled in the art and hence the method is described only generally.

Assume there are N measurements with index i, of the RTT ($RTT_i$) from the wireless measuring station 110 to the target station 120. For an arbitrary target location, the RTT may be modelled by a function f(xi, α) where vectors xi are the known locations of the mobile wireless measuring station 110, latitude, $x_i^{LAT}$, and longitude, $x_i^{LON}$, and altitude, $x_i^{ALT}$, and where parameter vector a defines the estimated location of the target station 120 in terms of latitude, $\alpha^{LAT}$, and longitude, $\alpha^{LON}$, and altitude, $\alpha^{ALT}$, plus other parameters that may include a turnaround offset, $\alpha^{OFF}$, to be determined, where $\alpha^{OFF}$ corresponds to the packet turnaround time of the target station 120.

The target location and offset, $\alpha^{LAT}$, $\alpha^{LON}$, $\alpha^{ALT}$, and offset $\alpha^{OFF}$, may be determined by first defining a squared residual, $SR(rtt)_i$. $SR(rtt)_i$ is the square of the difference between the measurement of $RTT_i$, and the computation of total travel time, $f(x_i, \alpha)$:

$$SR(rtt)_i = [RTT_i - f(x_i, \alpha)]^2 \quad (6)$$

where $[RTT_i - f(x_i, \alpha)]$ is the residual, $R(rtt)_i$ defined as the difference of $RTT_i$, from the computed distance multiplied by the factor (2/c) and modified by offset to convert that distance to a model round trip time:

$$f(x_i, \alpha) = \alpha^{OFF} + 2/c(d(x_i, \alpha)) \quad (7)$$

where $$d(x_i, \alpha) = \left[ \left(x_i^{LAT} - \alpha^{LAT}\right)^2 + \left(\left(x_i^{LON} - \alpha^{LON}\right) * \cos\left(x_i^{LAT}\right)\right)^2 + \left(x_i^{ALT} - \alpha^{ALT}\right)^2 \right]^{\frac{1}{2}}$$

It may be noted that the speed of light is in the units of geographic distance divided by the units of RTT. For example, if latitude and longitude are used for location and microseconds are used for RTT, then c=0.0027027 degrees/microsecond. Longitude distances are scaled by the cosine of the latitude to account for spherical coordinates. All distances are sufficiently small to use planar approximation.

If the errors are Gaussian, then the best value for the target location parameters, α, may be obtained by minimizing the sum of the squared residuals $SSR(rtt) = \Sigma_i S R(rtt)_i$ which is defined by setting the gradient of the SSR to zero:

$$0 = \nabla_\alpha \left( \sum_i S R_i \right) = -2 \sum_i [RTT_i - f(x_i, \alpha_i)][\nabla_\alpha f(x_i, \alpha)] \quad (8)$$

A Jacobian $J_{i\alpha}$ may be defined as $J_{i\alpha} = \nabla_\alpha f(x_i, \alpha)$. The Jacobian $J_{i\alpha}$ may be utilized to define the direction to the minimum, known as the Steepest Descent method. The method may be utilized to define the direction and step size to the minimum, known as the Gauss-Newton method, or may be utilized to define the end stage direction and step size to the minimum, which may be referred to as the "minimum conditions", known as the Levenberg-Marquardt method.

Once this minimum is found, then the confidence ellipse, known as the CEP, may be found using the Jacobian $J_{i\alpha}$ evaluated with the parameter values determined by the fit. In the first step, the Hessian $H_{\alpha'\alpha}$ may approximately be defined by $$H_{\alpha'\alpha} = \sum_i [J_{i\alpha'}]^T J_{i\alpha} \quad (9)$$

followed by a correlation matrix $\rho_{\alpha'\alpha}$ defined as the inverse of the Hessian $H_{\alpha'\alpha}$:

$$\rho_{\alpha'\alpha} = H_{\alpha'\alpha}^{-1} \quad (10)$$

Then, a confidence ellipse, comprising length, width and orientation θ, may be defined for the resulting location, as per Table 1:
Table 1—Location Confidence Ellipse parameters
Tan (2Θ)=2*$\rho_{01}$/($\rho 00-\rho 11$);
Length$^2$=$\rho_{00}$ Cos (θ) Cos (θ)+$\rho_{11}$ Sin (θ) Sin (θ)+2 $\rho_{01}$ Cos (θ) Sin (θ) Width$^2$=$\rho_{11}$ Cos (θ) Cos (θ)+$\rho_{00}$ Sin (θ) Sin (θ)−2 $\rho_{01}$ Cos (θ) Sin (θ)
As discussed above, a standard technique to determining the best fit to function, $f(x_i, \alpha)$, is by utilization of the method of minimization of sum of squared residuals, SSR, also known as the least squared residuals. For non-linear functions, such as $f(x_i, \alpha)$, there are various iterative methods that may be utilized including those known as Steepest Descent, Gauss-Newton, and Levenberg-Marquardt. These methods are known to one skilled in the art.

Figure 5:
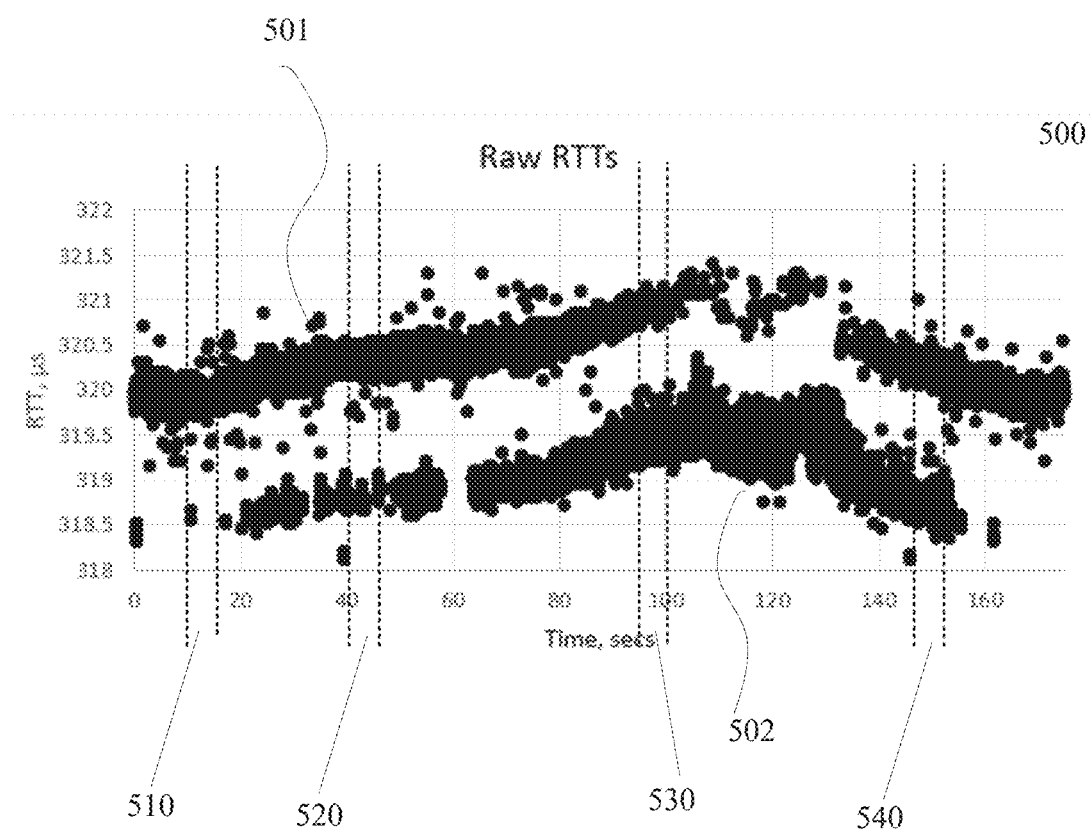
FIG. 5 is an example scatter plot graphical representation of RTTs measured by a mobile measuring station from exchanges of packets as described above with reference to FIGS. 3, 4 and 5 over a period of 175 seconds.

FIG. 5 is an example scatter plot graphical representation of RTTs measured by a mobile wireless measuring station 110 from exchanges of packets 212 and 224 as described above with reference to FIGS. 3 and 4, over a period of 175 seconds. The two distinct groups of RTTs 501 and 502 are the result of the target station 120 varying its value of SIFS. The RTT values are naturally scattered due to propagation variations. In the general sense, a curve fit may be made to best fit the plot of the RTTs. With the RTT variation as shown in scatter plot 500, an accurate curve fit is impossible.

Figure 6A:
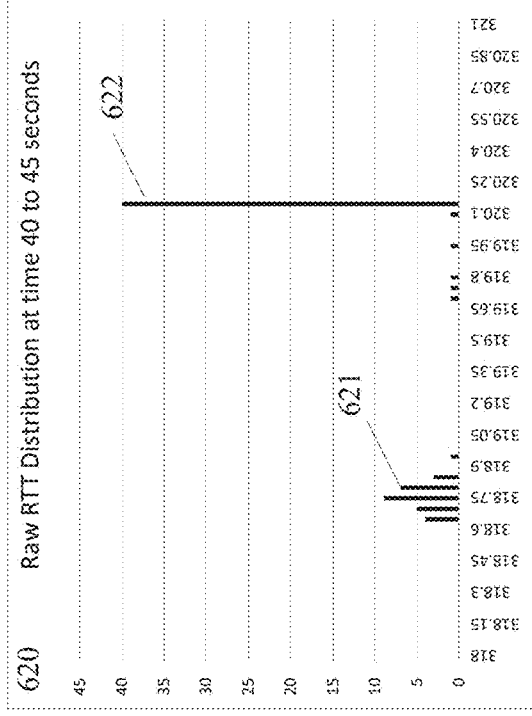
FIGS. 6A, 6B, 6C, and 6D are a set of RTT histograms corresponding to selected 5 second periods with 0.05 μs bins.
Figure 6B:
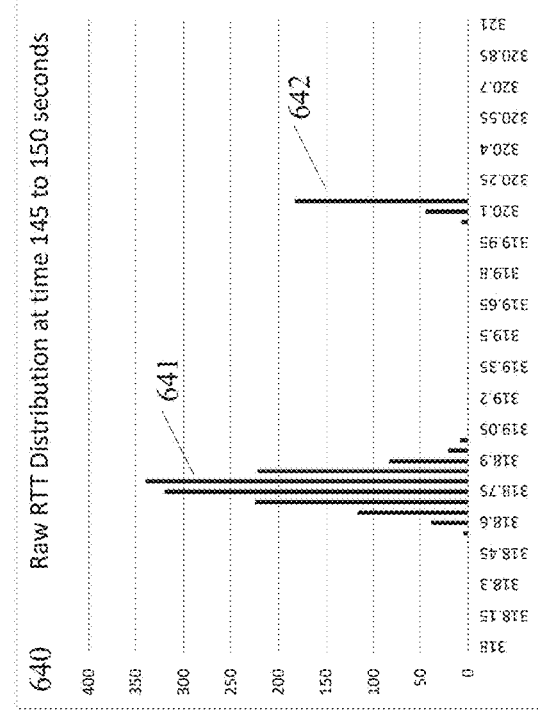
Figure 6C:
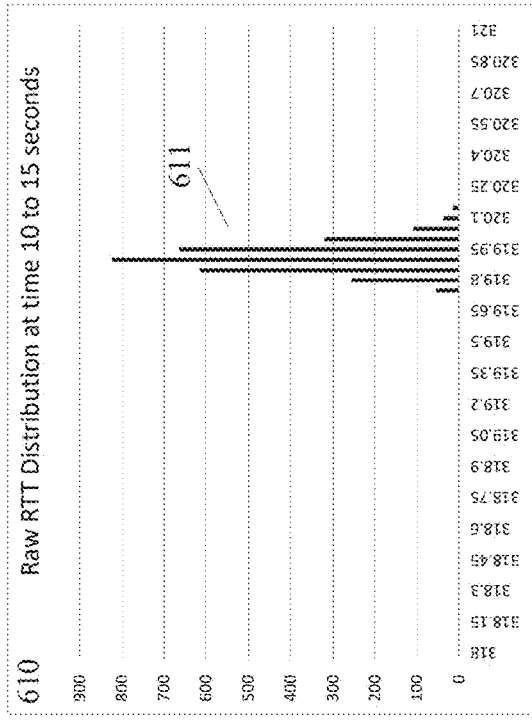
Figure 6D:
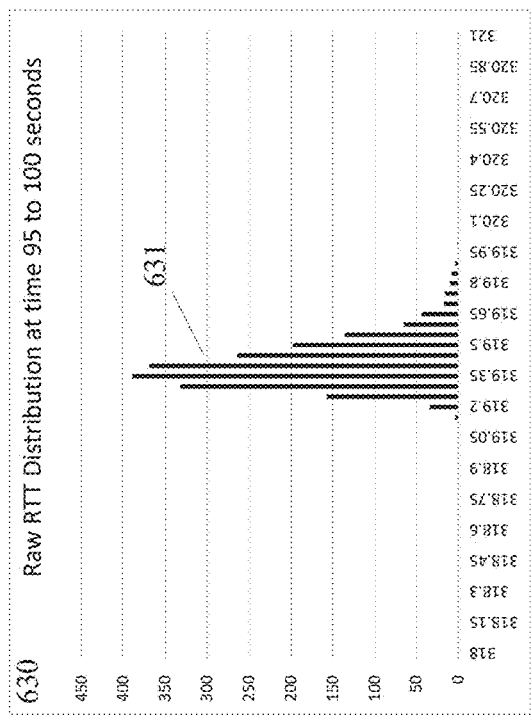

FIGS. 6A, 6B, 6C, and 6D are a set of RTT histograms corresponding to selected 5 second periods with 0.05 μs bins. In FIG. 6A, histogram 610 corresponds to the RTTs measured in the period 10 to 15 seconds, 510. In FIG. 6B, histogram 610 corresponds to the RTTs measured in the period 40 to 45 seconds, 520. In FIG. 6C, histogram 630 corresponds to the RTTs measured in the period 95 to 100 seconds, 530. In FIG. 6D, histogram 640 corresponds to the RTTs measured in the period 145 to 150 seconds, 540.

The histogram 610 for 10 to 15 seconds shown in FIG. 6A, indicates that the RTTs in RTT group 611 generally correspond to a single SIFS value. The histogram 620 for 40 to 45 seconds shown in FIG. 6B, shows that the RTTs are in two RTT groups 621 and 622 indicatives of more than one SIFS value. The histogram 630 for 95 to 100 seconds shown in FIG. 6C, shows that the RTTs 631 again generally correspond to single SIFS value but that this SIFS value is aligned with the RTT group 621 not with the SIFS value used for RTT groups 611 and 622. The histogram 640 for 145 to 150 seconds shown in FIG. 6D, shows two groups of RTT distributions 641 and 642 again indicative of more than one SIFS value.

The histograms as depicted in FIGS. 6A, 6B, 6C, and 6D are discrete and may be affected by SIFS jitter as well as propagation variations. In order to mitigate these variations, the underlying probability density functions, PDF, may be estimated and the results may be effectively smoothed in order to find accurate maximums. Different approaches may be used to produce the PDF and/or smooth the histograms. One method is to apply a window function to the set of RTTs. The window function may be weighted or simply sum a number of adjacent values for every value in the histogram. Another more accurate method is to estimate the probability density function using a kernel density estimation, KDE. The distribution of RTT data points may be mathematically calculated by an unknown, underlying probability density function that may be estimated via Kernel Density Estimation, KDE. The superposition of kernel functions, weighing each data point, generates the KDE surface, which contains local maxima or peaks, where the highest frequency value RTTs or modes reside. A technique known as a "non-parametric mean shift clustering algorithm" calculates the weighted mean within the bandwidth or distance of the window of each RTT data point, then shifts the data point to the newly updated weighted mean (mean-shift vector), and iteratively performs this process until each RTT data point has converged to local or global maximum RTT values, known as "modes". This iterative process ceases when the mean-shift vector is smaller than a specified tolerance, and the data point is said to have converged. When all RTT data points have converged, the data has been optimized.

KDEs may produce a smooth PDF suitable for analysis of the RTT results. A range of kernel functions may be used but a common kernel is the standard normal function, Gaussian. The bandwidth of each data point being evaluated encompasses other data points in its neighborhood, each weighted by their own kernel functions. The bandwidth centered upon the data point being evaluated defines the region of a newly weighted mean being calculated, which may be utilized to shift the data point towards the direction of highest density. This procedure may be executed for every data point. The quantity of modes in a density distribution is dependent on the bandwidth of the kernel function implemented. For large bandwidths, the density distribution contains a single or few modes, while smaller bandwidths may seek out more modes. For example, a bandwidth, i.e., a standard deviation, σ, of 0.3 μs for the Gaussian distribution KDE is suitable to cater for the expected jitter in the RTTs from a Wi-Fi AP. In the following descriptions, the general term "KDE" is used together with modes and peaks, but it should be understood that these terms may encompass techniques such as non-parametric mean shift clustering.

Figure 7B:
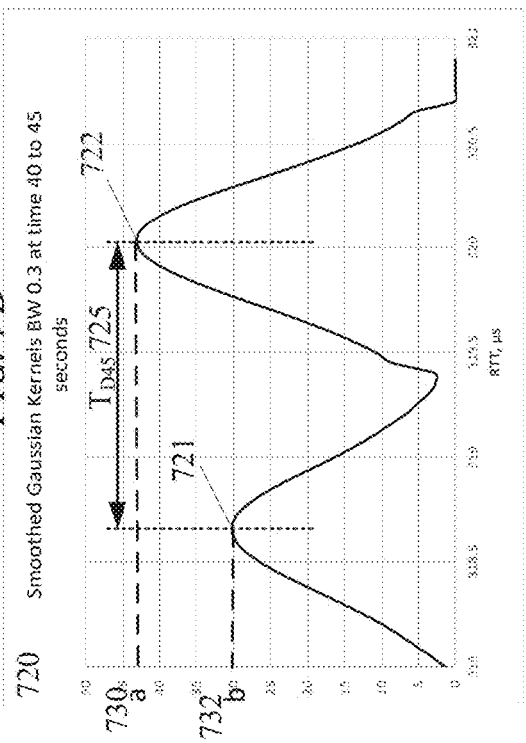
FIGS. 7A, 7B, 7C and 7D are an example of a set of smoothed histograms, KDEs using a Gaussian kernel with standard deviation σ of 0.3, corresponding to the set of histograms in FIGS. 6A, 6B, 6C, and 6D respectively.
Figure 7D:
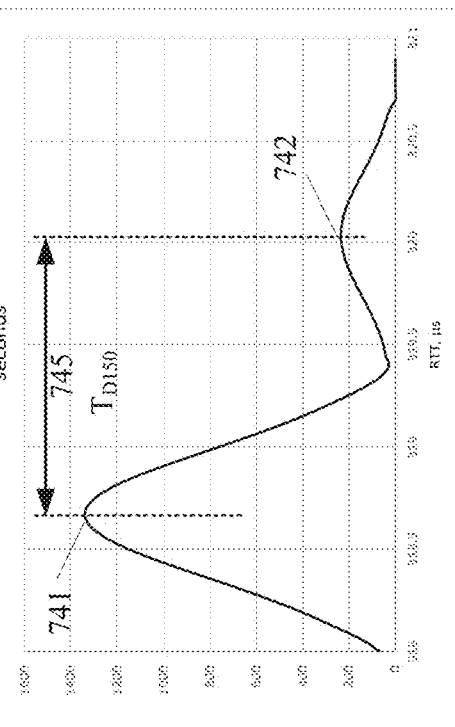
Figure 7A:
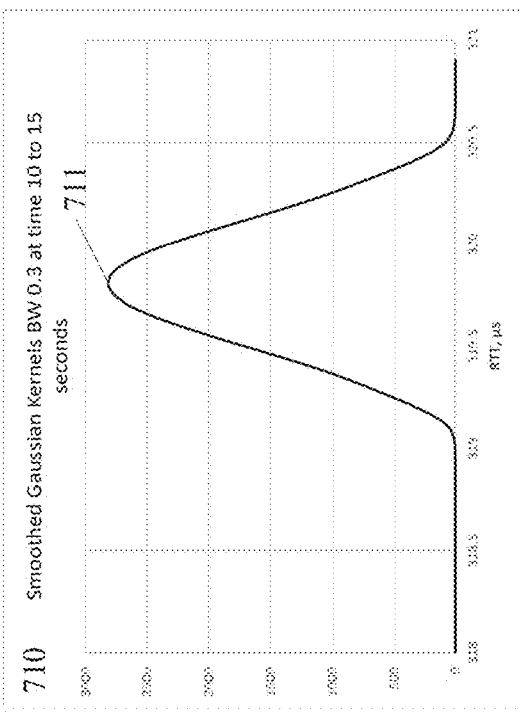

FIGS. 7A, 7B, 7C and 7D are an example of a set of smoothed histograms, KDEs using a Gaussian kernel with standard deviation σ of 0.3, corresponding to the set of histograms in FIGS. 6A, 6B, 6C, and 6D, respectively. The effect of KDE is to produce a PDF estimation that clearly demonstrates the mode(s) and peak(s). The term "smoothed histogram" is used to cover the general concept that the histograms may be smoothed by various means, but it should be understood that, in these examples, they are KDEs using a Gaussian kernel with standard deviation σ of 0.3. In FIG. 7A, smoothed histogram 710, derived from FIG. 6A histogram 610, comprises a single mode and has a single peak 711. In FIG. 7B, smoothed histogram 720, derived from FIG. 6B histogram 620, comprises two modes and has two peaks 721 and 722. The difference $T_{D45}$ 725 between the two peaks, 721 and 722, is related to the difference between two values of SIFS that were used by the wireless target station 120 during the period 40 to 45 seconds.

Figure 7C:
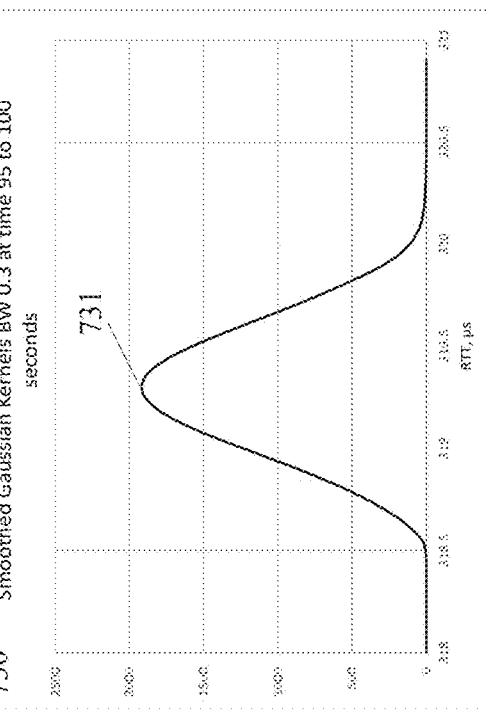

In FIG. 7C, smoothed histogram 730, derived from FIG. 6C histogram 630, comprises a single mode and has a single peak 731. In FIG. 7D, smoothed histogram 740, derived from FIG. 6D histogram 640, comprises two modes and has two peaks 741 and 742. The difference $T_{D150}$ 745 between the two peaks, 741 and 742, is related to the two values of SIFS that were used by the target station 120 during the period 145 to 150 seconds. Smoothed histograms 710 and 730 indicate a single SIFS mode during the 5 second time periods, whereas smoothed histograms 720 and 740 indicate dual SIFS modes.

The peak RTT values 711, 721, 722, 731, 741, and 742, may be determined by several methods based upon the application of KDE. It may be assumed that in the case of dual SIFS modes, the peaks will not be closer than 2 $\sigma$. The selection of $\sigma=0.3$ μs bandwidth for the Gaussian kernel is compatible with this expectation that the peaks due to different modes will not be closer than $2\sigma$.

In a case where a target station 120 is exhibiting dual SIFS, over a long period of, for example, 3 to 5 seconds, there is a greater chance that the two RTT modes are present, whereas over a short period, say 64 ms, it is more likely that a single RTT mode is present. As discussed above with reference to FIG. 4, bursts of M ranging packets 212 may be sent separated by Tw 471. For example, bursts of 64 ranging packets may be sent, at intervals of 1 ms, separated by 20 ms. Hence, in order to measure the difference between the two RTT modes, as discussed above with reference to FIG. 7, in the general sense RTTs over a number of bursts are required, for example, performing the KDE calculations at 3 second intervals will tend to provide dual RTT modes.

The residual $R(rtt)_i$ for the ith RTT, from equations (6) and (7) is:

$$R(rtt)_i = \left[ RTT_i - \alpha^{OFF} + \right.$$
$$\left. \frac{2}{c}\left[(x_i^{LAT} - \alpha^{LAT})^2 + ((x_i^{LON} - \alpha^{LON}) * \cos(x_i^{LAT}))^2 + (x_i^{ALT} - \alpha^{ALT})^2\right]^{\frac{1}{2}}\right] \quad (11)$$

Rearranging: $R(rtt)_i = [(RTT_i - \alpha^{OFF}) + TOFi]$ (12)

where TOFi is the estimated time of flight TOF between the mobile wireless measuring station 110 and the target station 120 when RTTi measurement is recorded (as discussed above with reference to FIG. 1).

In cases where the target station 120 is exhibiting dual SIFS values, as discussed above with reference to FIGS. 5, 6 and 7, then the turnaround time, aOFF, may take one of two values, i.e.: $\alpha_1^{OFF}=Ts$ or $\alpha_2^{OFF}=Ts+\Delta$ (13)

where Ts is the lower SIFS value
and $\Delta$ is the offset difference between the dual RTT modes.

All minimization methods, for example Levenberg Marquardt, minimize the difference between the measured RTT–$\alpha^{OFF}$ and the TOF, equation (12), where the TOF is determined by the distance between the known location of the wireless measuring station 110 and the estimated location of the target station 120, times 2/c. In some circumstances, however, as discussed above with reference to FIGS. 5, 6 and 7, and equation (13), there are two offsets, $\alpha_1^{OFF}=Ts$ and a larger value $\alpha_2^{OFF}=Ts+\Delta$. A value for $\Delta$ may be measured every 3 seconds and the average and standard deviation determined. In the general sense, the average offset difference, $\Delta$, is 1 to 3 μs with a standard deviation of about 0.05 μs.

For each single burst of ranging packets 212 and response packets 214, a KDE analysis may then result in a single or dual $RTT(s)_{peak}$. Having first established a value for the RTT mode difference $\Delta$, by analysis of RTTs over a long period, say 3 seconds, the short single burst RTT(s) peak may then be minimized during the fitting process and repeated each time a fit is performed, for one of the following two cases:
1) When two RTT(s) peak modes are observed:

a. Smaller $RTT_{peak}$, use $RTT=RTT_{peak}-Ts$ (14)

b. Larger $RTT_{peak}$, use $RTT=RTT_{peak}-Ts-\Delta$ (15)

2) When one RTT peak mode is present:

If $|RTT_{peak}-Ts-TOF|<|RTT_{peak}-Ts-\Delta-TOF|$ (16)

then use $RTT=RTT_{peak}-Ts$
else use $RTT=RTT_{peak}-Ts-\Delta$

For each burst of RTTs, therefore, if only one RTT mode is present, as per 2), then by determining the smaller residual, the correct value for $\alpha^{OFF}$ may be used in the minimization process. The difference value, $\Delta$, is the average over the entire data set and the choice of whether to use $\alpha_1^{OFF}=Ts$, or $\alpha_2^{OFF}=Ts+\Delta$, is made by the fitting process.

Figure 8:
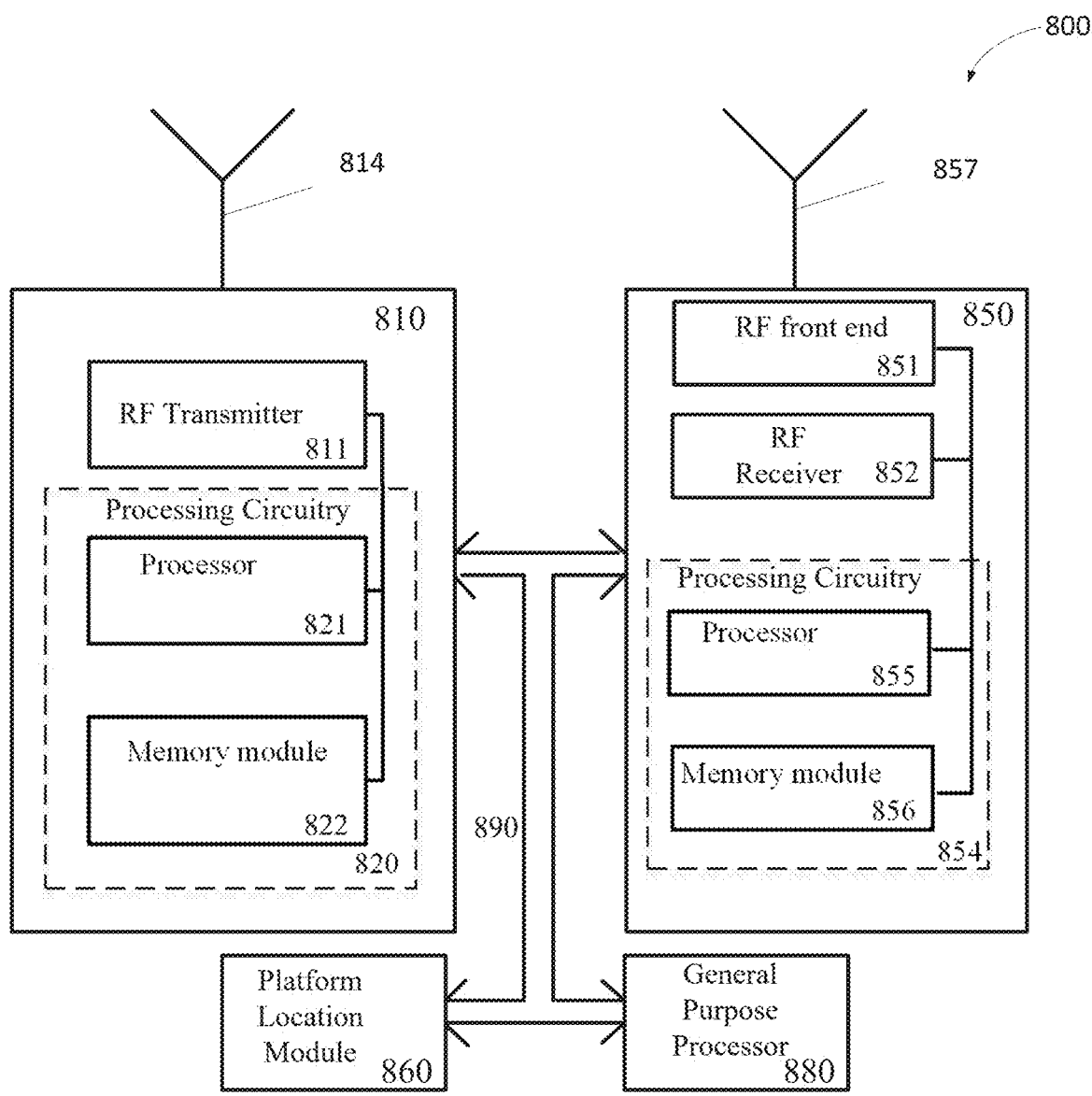
FIG. 8 illustrates a block diagram of an example wireless communication device which, according to an embodiment of the disclosure, may be used as or as part of the wireless measuring station.

FIG. 8 illustrates a block diagram of an example wireless communication device 800 which, according to an embodiment of the disclosure, may be used as or as part of the wireless measuring station 110. The wireless communication device 800 may be any device capable of wirelessly receiving signals and transmitting signals and may be configured to execute any of the methods of the IEEE 802.11-2020 Standard. Wireless communication device 800 may be one or more stations or access points, and the like. Wireless communication device 800 may be one or more wireless devices that are based upon the IEEE 802.11-2020 specification and each may be configured to act as a transmitter or a receiver. The embodiment described herein is that where wireless communication device 800 includes a wireless transmitter 810 and a wireless receiver 850. The wireless communication device 800 may also include a platform location module 860 and a general purpose processor 880 which are interconnected to the wireless transmitter 810, and the wireless receiver 850 by a data bus 890.

In some embodiments, the wireless transmitter 810 includes an RF transmitter 811 and processing circuitry 820 that includes processor 821, and memory module 822. The RF transmitter 811 may perform the functions of modulation, as described in IEEE 802.11-2020 and amplification for the transmission of the Wi-Fi packets via antenna 814. In some embodiments the processing circuitry 820 and/or the processor 821 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF transmitter 811 may be performed by processing circuitry 820. The processing circuitry 820 may be configured to control any of the methods and/or processes described herein and/or to cause such methods, and/or processes to be performed, e.g., by the RF transmitter 811. The memory module 822 may be configured to store data, programmatic software code and/or other information described herein. In some embodiments, the software may include instructions that, when executed by the processing circuitry 820, causes the processing circuitry 820 to perform the processes described herein with respect to the wireless transmitter 810.

In some embodiments, the wireless receiver 850 includes an RF front end 851, an RF receiver 852, processing circuitry 854 that includes a processor 855 and a memory module 856. The RF front end 851 may perform the usual functions of an RF receiver front end such as low noise amplification, filtering and frequency down conversion so as to condition the received signal suitable for inputting to the RF receiver 852. The RF receiver 852 may perform the functions of demodulation of the Wi-Fi packet received via antenna 857. In some embodiments wireless transmitter 810 and wireless receiver 850 may share the same antenna array together with the appropriate RF switches, combiners and splitters.

In some embodiments the RF receiver 852 and/or the processing circuitry 854 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF receiver 852 may be performed by the processing circuitry 854. The processing circuitry 854 may be configured to control any of the methods and/or processes described herein and/or to cause such methods, and/or processes to be performed, e.g., by the wireless receiver 850. The memory module 856 is configured to store data, programmatic software code and/or other information described herein. In some embodiments, the software may include instructions that, when executed by the processing circuitry 854, causes the processing circuitry 854 to perform the processes described herein with respect to the wireless receiver 850.

According to this embodiment of the disclosure, the wireless receiver 850 may be configured to measure and monitor an input signal's attribute, such as may include one or more of a signal transmitted by wireless transmitter 810, data and control packets, and the response signal, including control packets, transmitted by an access point or station that may be based upon the IEEE 802.11-2020 Standard. Such packets may include data null, ACK, RTS and CTS packets. The memory module 856 may store instructions for executing any method mentioned in the IEEE 802.11-2020 Standard, input signals, and results of processing of the processor 855, signals to be outputted and the like. Processing circuitry 854 may output to the general purpose processor 880 attributes of the received packets 224 such as RTT.

According to an embodiment of the disclosure, the RF transmitter 811 may be configured to transmit signals and the processing circuitry 820 may be configured to prepare the transmitted signal attributes based upon the IEEE 802.11-2020 Standard. Such transmitted packets may include data packets, control packets and management packets. Such control packets may include RTS packets. The memory module 822 may store instructions for executing any method mentioned in the specification, input signals, and results of processing of the processor 821, signals to be outputted and the like.

According to another embodiment of the disclosure, the wireless receiver 850 may be configured to receive the transmissions of another wireless communications device, e.g., target station 120, and the processing circuitry 854 may be configured to monitor an attribute of the transmissions of the other wireless communication device and determine the received times of packets from the other wireless communication device, as discussed above with reference to FIGS. 2 and 3.

According to an embodiment of the disclosure, the wireless transmitter 810 may be configured to transmit bursts 451 of packets to another wireless communication device, as described in FIG. 4, and the processor 821 may be configured to prepare the attributes of the ranging packet 212 to be transmitted. Processor 821 may also be configured to set the timing Tp 350 between each ranging packet 212 transmission, the number M of ranging packet 212 transmissions within each burst, the wait time Tw 471 between bursts, as well as the start and stop times for the sequence of bursts.

According to an embodiment of the disclosure, a general purpose processor 880 may be used to control the operations of the wireless communication device 800 and in particular the wireless transmitter 810 and wireless receiver 850. The general purpose processor 880 may provide an interface to a user via a keyboard, mouse and display allowing a user to select the attributes of the target, wireless target station 120, control the start and stop of the transmissions of ranging packets 212 and perform the calculations described herein for the correction of RTTs from a target station 120 that is employing more than one SIFS value. The general purpose processor 880 may also carry out the various calculations as described in this disclosure, such as determining a location for the target station 120 based upon the resulting RTTs, and may also prepare the measurement results for disclosure to an operator or user. In some embodiments the general purpose processor 880 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the wireless communication device 800 may be included in a single physical device/housing or may be distributed among several different physical devices/housings.

According to an embodiment of the disclosure, a platform location module 860 may be used to input, via the data bus 890, to the general purpose processor 880 and/or the processing circuitry 820 and/or 854 the location of the platform that is carrying the wireless communication device 800. The platform location module 860 may comprise navigation equipment such as a GPS receiver and/or a gyro and may provide both the location and heading of the wireless communication device 800 to the general purpose processor 880, and processing circuitries 820 and 854. The location and heading of the wireless communication device 800, together with the RTTs may be used by the general purpose processor 880 to calculate and display the location of the target, i.e., wireless target station 120.

Figure 9:
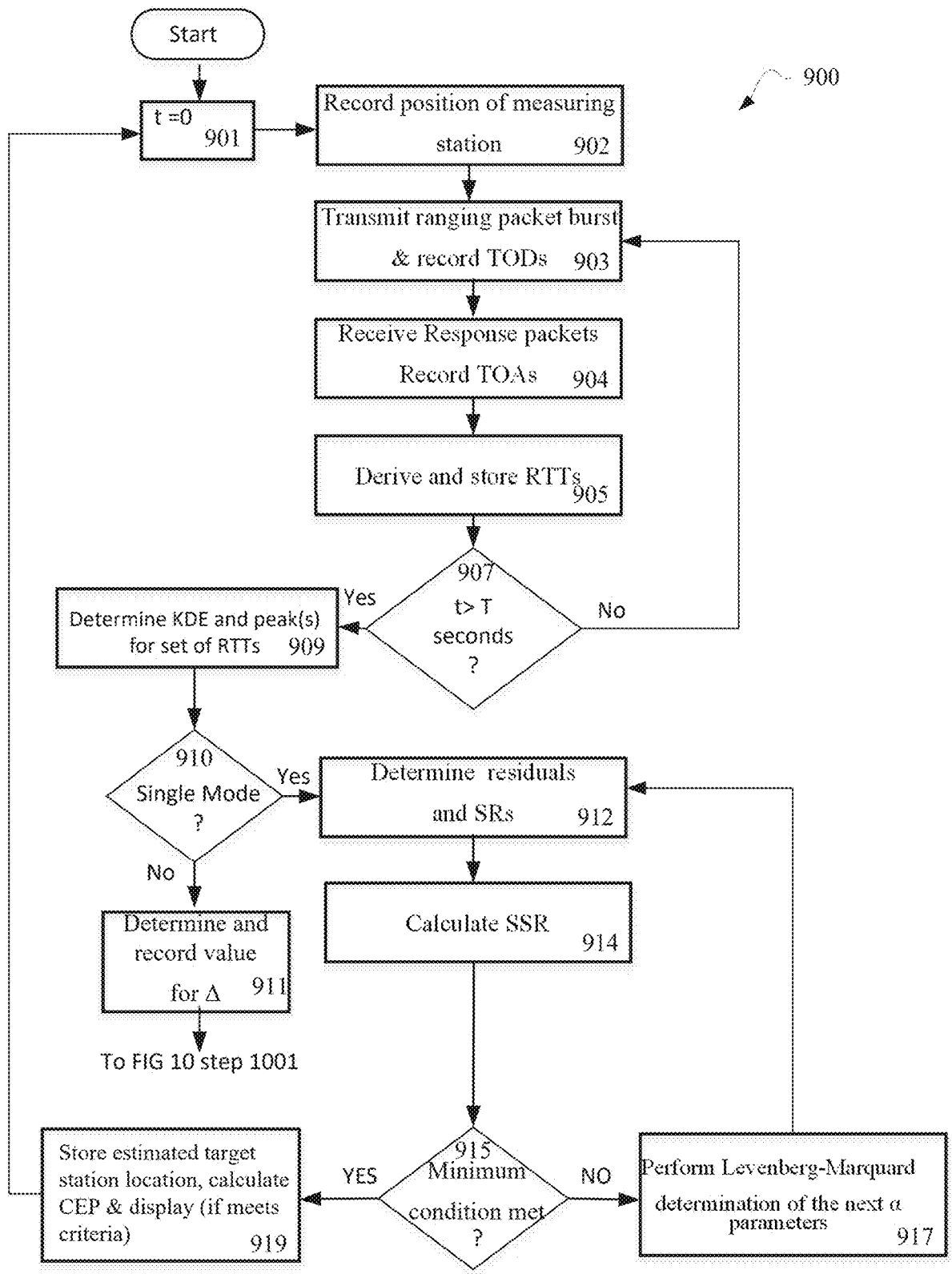
FIGS. 9, 10, and 11 are a flowchart of an example process for determining if the response packets, received by a wireless communications device, are transmitted by a target station that has more than one SIFS mode, estimating the mode difference and using that difference in the Levenberg-Marquard fitting process.
Figure 10:
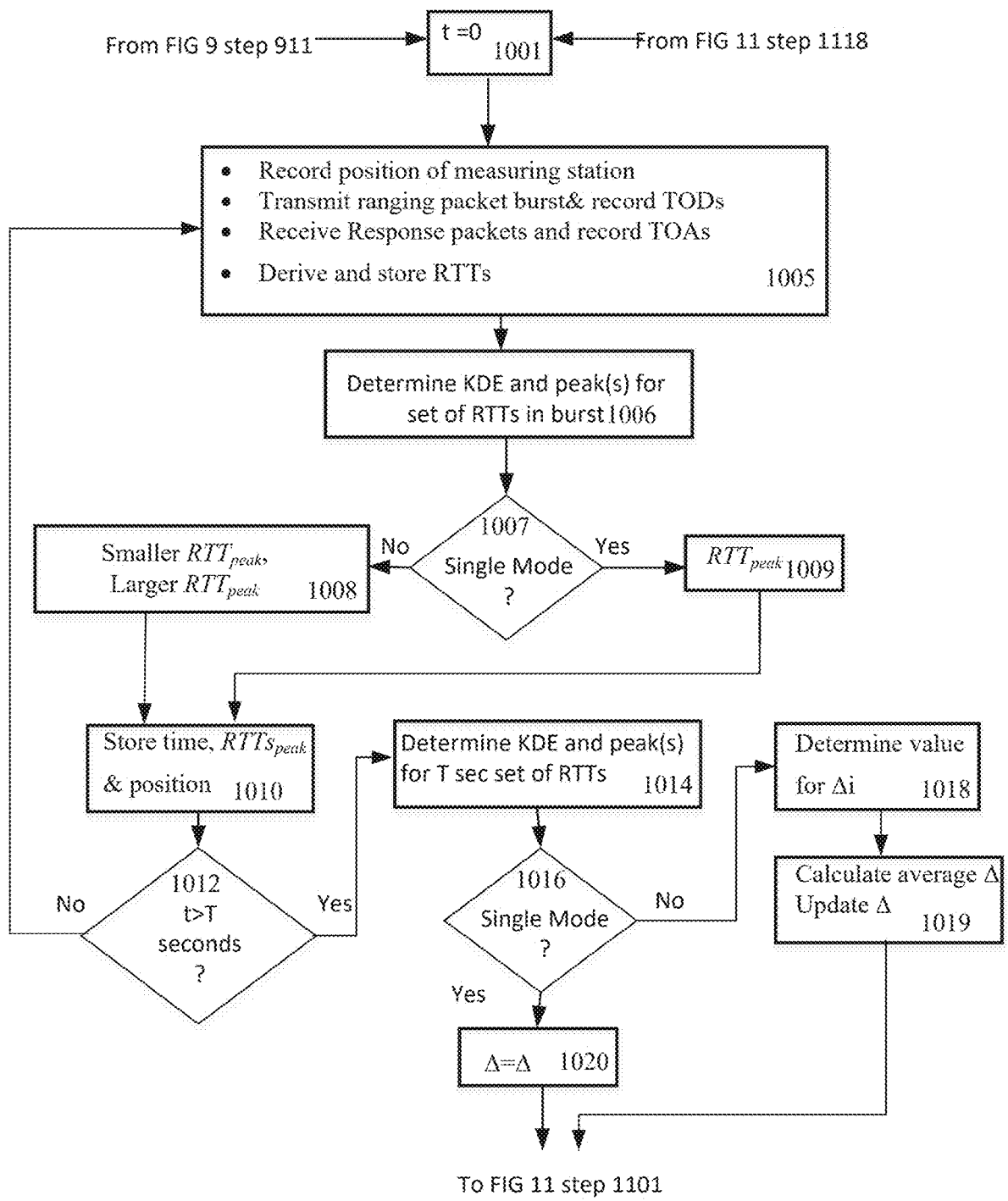
Figure 11:
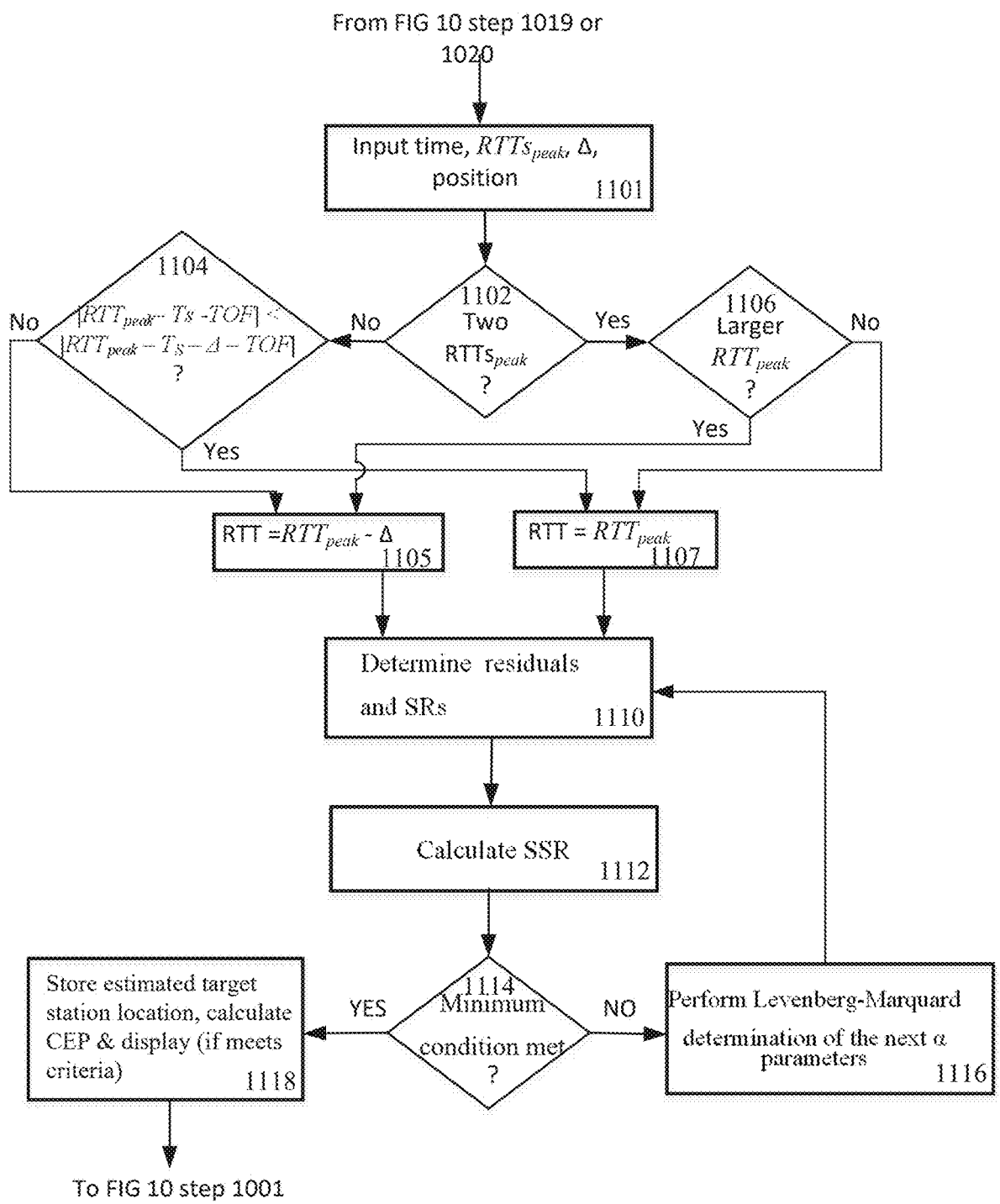

FIGS. 9, 10, and 11 is a flowchart of an example process 900 for determining if the response packets 224, received by a wireless communications device 800, are transmitted by a target station 120 that has more than one SIFS mode, estimating the mode offset if present, and using that offset in the Levenberg-Marquard fitting process.

Process 900 may start at step 901 where a timer t is initialized. At step 902, the position of the wireless measuring station 110 is recorded together with time. The position and time may be provided by a GPS in the platform location module 860. The data may be stored in a memory module 822, and/or 856 and/or general purpose processor 880. At step 903, as discussed above with reference to FIG. 4, a burst of ranging packets 212 is transmitted, addressed to target station 120. The packet may be transmitted by RF transmitter 811 via antenna 814. The format of the ranging packets 212 may be supplied by the processing circuitry 820 using information, such as target station address, entered by a user via general purpose processor 880. Ranging packets 212 may also be received by wireless receiver 850 and the TODs of each ranging packet 212 may be recorded in memory module 856. In step 904 response packets 214 may be received from target station 120 via antenna 857, RF front end 851 and demodulated by RF receiver 852. The TOAs of the response packets 214 may be recorded in memory module 856. In step 905 the RTTs, i.e., TOA-TOD, for each of the ranging packet 212, response packet 214 exchanges may be determined and recorded in processing circuitry 854 and/or general purpose processor 880. At step 907 the timer t is checked and if a preset time T has not expired, the process returns to step 903 where another burst of ranging packets 212 is transmitted. Steps 903, 904 and 905 result in sets of recorded time and RTTs for bursts over the time period of T.

If, at step 907, time T has expired then at step 909, as discussed above with reference to FIGS. 6 and 7, the set of RTTs is examined, the KDE and its modes/peaks calculated and at step 910 a determination is made as to if there is just one mode and corresponding peak, $RTT_{peak}$. The KDE calculations and peak determination may be performed by processing circuitry 854 and the results recorded in memory module 856 and/or by general purpose processor 880.

If, at step 910, it is determined that there is only a single mode/peak present for both the current time T and previous times T, then at step 912, the residuals, R(rtt), are determined as defined in equations (11) and (12) and the squared residuals calculated as discussed above with reference to equations (6) and (7). At step 914, the sum of squared residuals is calculated. It may be determined, at step 915, if the minimum conditions have been met, i.e., the end stage direction and step size is at a minimum, and if not, the Levenberg-Marquardt non-linear fitting scheme may be performed at step 917 to determine a next set of values for the α parameters. After completion of the calculations in step 917, the minimization process returns to steps 912 and 914. The Levenberg-Marquardt non-linear fitting scheme and the minimization process may be carried out in the general purpose processor 880. The Levenberg-Marquardt non-linear fitting scheme and the minimization process is known.

If, at step 915, the minimum conditions are met, then at step 919, the confidence ellipse, CEP, may be calculated and, if it meets certain criteria, for example size and confidence, displayed. The calculation and display of the CEP may take place in the general purpose processor 880 of which a display might form part. The method then returns to step 901.

If the target station does not exhibit dual RTT modes, then process 900 will continue through steps 901 to 909. If, however, at step 910, dual RTT modes are observed then at step 911, the offset value A may be estimated and recorded and the process moves to FIG. 10 step 1001. The offset value A may be recorded in memory module 856 and/or general purpose processor 880, together with the set of RTTs stored in step 905.

At step 1001, timer t is initialized. At step 1005, the position of the wireless measuring station 110 is recorded, a burst of ranging packets 212 transmitted, the TODs recorded, the corresponding response packets 214 received and the TOAs recorded. The RTTs are derived and stored. Step 1005 is the same as steps 902, 903, 904 and 905. At step 1006, similar to step 909, the set of RTTs is examined, the KDE and corresponding modes/peaks calculated and at step 1007, a determination is made as to if there is just one mode and corresponding peak, similar to step 910. However, in contrast to 910 which involves bursts over time T, 1006 involves a single burst. If, at step 1007, two peaks are derived, then at step 1008 both peaks, [$RTT_{peak}$ larger] and [$RTT_{peak}$ smaller] are noted. If at step 1007, there is just one peak derived, then at step 1009 that $RTT_{peak}$ is noted. At step 1010, the $RTT(s)_{peak}$ from steps 1008 or 1009 are stored together with time and the position of wireless measuring station 110 that was recorded in step 1005 for the single burst. At step 1012, the timer t is checked and if t<T then the process returns to step 1005 and another burst of ranging packets 212 is sent. The list of time, $RTT(s)_{peak}$, and wireless measuring station 110 position is updated in step 1010 until at step 1012, the timer t is equal to or greater than T. The list may be stored in the general purpose processor 880. If, at step 1012, t>T then at step 1014 the complete list of RTTs stored at step 1005 is examined and the KDE and its peaks calculated. At step 1016, if only a single peak is present then, at step 1020, the value for the offset Δ is unchanged. If, however, at step 1016, two peaks are present, then the offset $\Delta_i$ is calculated and at step 1019, the average value, $\Delta_{ave}$, for the offsets is calculated using all the values of $\Delta_i$ previously measured. The individual values for $\Delta_i$ may be stored together with the time and RTTs such that an average $\Delta_{ave}$, may be calculated. The lists, the KDE calculations and the calculation of $\Delta_{ave}$ may take place in the general purpose processor 880. Once the (new) value for $\Delta_{ave}$ has been established, at steps 1019 or 1020, then the process advances to FIG. 11 step 1101.

At step 1101, the complete list of time, $RTTs_{peak}$, $\Delta_{ave}$, and wireless measuring station 110 position is inputted. For each discrete burst, at step 1102, it is checked if two $RTT(s)_{peak}$, as determined at steps 1007, 1008 and 1009, are present. If two RTT(s) peak are present, then at step 1106, the larger $RTT_{peak}$ is determined and, as discussed above with reference to equations (14) and (15), at step 1105, $RTT=RTT_{peak}-\Delta_{ave}$. For the smaller $RTT_{peak}$, at step 1107, $RTT=RTT_{peak}$. If at step 1102, only a single $RTT_{peak}$ is present, then at step 1104, as discussed above with reference to equation (16), a check is made if $|RTT_{peak}-T_S-TOF|<|RTT_{peak}-T_S-\Delta-TOF|$. If true, then at step 1107, $RTT=RTT_{peak}$, if false, then at step 1105 $RTT=RTT_{peak}-\Delta_{ave}$. At step 1110 the residuals, R(rtt), are determined as defined in equations (11) and (12) using either the $RTT_{peak}$ or the $RTT_{peak}-\Delta_{ave}$ values for each time and $x_i$ parameters for the wireless measuring station 110 and set of values for the α parameters, and the squared residuals calculated as discussed above with reference to equations (6) and (7). At step 1112, the sum of squared residuals is calculated. It may be then determined, at step 1114, if the minimum conditions have been met and if not, the Levenberg-Marquardt non-linear fitting scheme may be performed, at step 1116, to determine a next set of values for the α parameters. After completion of the calculations in step 1116, the minimization process returns to steps 1110 and 1112. The Levenberg-Marquardt non-linear fitting scheme and the minimization process may be carried out in the general purpose processor 880.

If, at step 1114, the minimum conditions are met, then at step 1118, the confidence ellipse, CEP, may be calculated and, if it meets certain criteria, displayed. The calculation and display of the CEP may take place in the general purpose processor 880 of which a display might form part. The method then returns to FIG. 10, step 1001.

The longer the time T, the better the possibility that, if dual RTT modes are present, then two peaks will be calculated by the KDE process. However, the time T also sets the time between calculations of the location and updates for the RTT offset Δ, hence T should not be too long. Furthermore, the time T cannot be so long as there to be significant changes in the RTTs (must be less than the offset difference Δ) due to changing TOF due to changing position of the wireless measuring station. An example value for T is 3 seconds.

In process 900, the adjustment value, Δ, is an average over the entire data set rather than in interim value which may be uncertain at the beginning of the data run and the choice of whether to use RTT−TOF or RTT−TOF−Δ) is made by the fitting process. With other known methods, if data collection starts with a single valued offset and does not exhibit dual values for an initial period, then there will be no reference RTT for "correction" of the initial period and that data will be lost to the previous dual RTT method. Moreover, the correction for the early data will be made on the basis of RTT difference defined by a small subset of the entire run and will therefore be less accurate.

With process 900, the SIFS offset correction is a full data average over all the data that is ready to process, rather than as an ongoing moving average to RTT. The standard deviation of the correction may be used to decide if the process is valid. Also, if there is a long gap between the data points without there being sufficient dual values recorded to decide the correct offset to use, doing this at fitting time allows the fitting process to try both offsets and then find the value that yields the lowest error.

Figure 12:
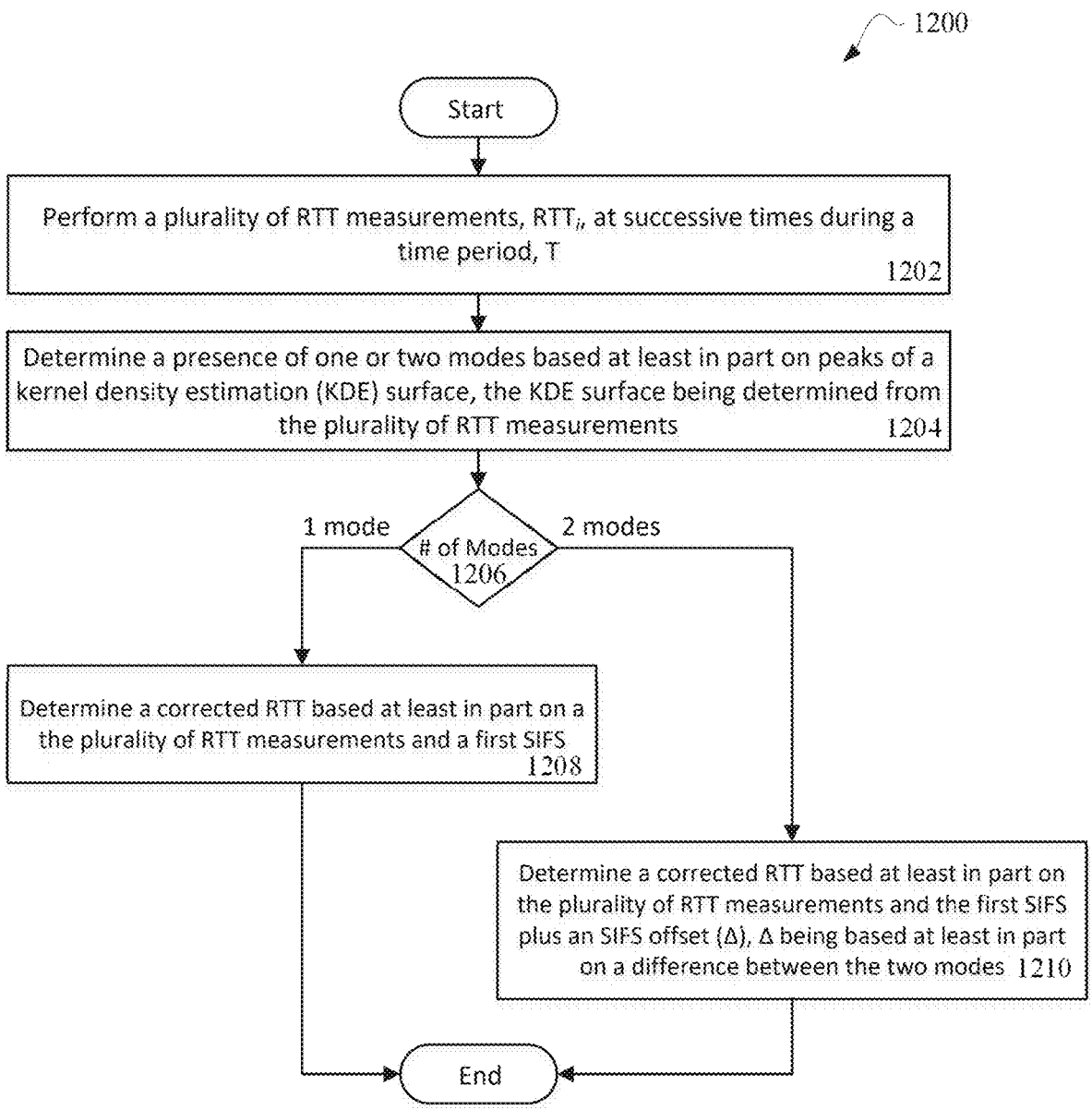
FIG. 12 is a flowchart of an example process for determining the geo-location of wireless local area network (WLAN) devices.

FIG. 12 is a flowchart of an example process 1200 for determining the geo-location of wireless local area network (WLAN) devices. The process may be performed by wireless communication device 800, including processing circuitry 820 and/or 854 and/or transmitter 811 and receiver 852. The process includes performing a plurality of RTT measurements ($RTT_i$) at successive times during a time period, T, at step 1202. The method also includes determining a presence of one or two modes based at least in part on peaks of a kernel density estimation (KDE) surface, the KDE surface being determined from the plurality of RTT measurements, at step 1204. When there is only one mode (step 1206), then a corrected RTT is determined based at least in part on the plurality of RTT measurements and a first SIFS (step 1208). When there are two modes (step 1206), a corrected RTT is determined based at least in part on the plurality of RTT measurements and the first SIFS plus an SIFS offset (A), A being based at least in part on a difference between the two modes (step 1210).

In some embodiments, the SIFS offset Δ is based at least in part on an average of previously determined SIFS offsets when there are two modes. In some embodiments, when there is only one mode and when $|RTT_{peak}-Ts-TOF|<|RTT_{peak}-Ts-\Delta-TOF|$, then the corrected RTT is determined as $RTT_{peak}-Ts$, and otherwise, then the corrected RTT is determined as $RTT_{peak}-Ts-\Delta$, where $RTT_{peak}$ is a peak RTT of the one mode, Ts is an offset corresponding to the first SIFS, Δ is the SIFS offset, and TOF is a time of flight. In some embodiments, determining the corrected RTT includes minimizing a sum of squared residuals, each squared residual being based at least in part on a difference between an $RTT_i$ and a total travel time, the total travel time being based at least in part on a target location parameter, a, determined by setting a gradient of the sum of squared residuals to zero. In some embodiments, a residual $R(rtt)_i$ is based at least in part on calculating $R(rtt)_i=[(RTT_i-\alpha^{OFF})+TOFi]$, where the subscript i denotes an $i^{th}$ RTT measurement of the plurality of RTT measurements and an $i^{th}$ time of flight $TOF_i$, and $\alpha^{OFF}$ is determined as Ts when there is only one mode and $\alpha^{OFF}$ is determined as Ts−Δ when there are two modes. In some embodiments, when there are two modes, the corrected RTT is determined as $RTTpeak-\alpha^{OFF}$, where $\alpha^{OFF}$ is equal to Ts for a first mode of the two modes and $\alpha^{OFF}$ is equal to Ts−Δ for a second mode of the two modes. In some embodiments, the method includes determining whether to use $\alpha^{OFF}=Ts$ or $\alpha^{OFF}=Ts-\Delta$ for corrected RTT determination is based at least in part on a numerical fitting process. In some embodiments, the KDE surface is determined by a superposition of kernel functions weighting each of the plurality of RTT measurements. In some embodiments, the kernel functions are Gaussian. In some embodiments, the time period T is selected to be less than the SIFS offset Δ.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of transmissions in a burst or continuous transmissions, time between updates to the RTT offset, the averaging of the RTT offset, time between calculations of CEP, the method used to determine the KDEs, selection of a bandwidth parameter σ, the details of the minimization scheme used for the RTT fitting process. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD) for determining a corrected round trip times (RTT) resulting from communication with a second WD, the second WD being configured with one or two short interframe spacings (SIFS), the method comprising:
   performing a plurality of RTT measurements ($RTT_i$) at successive times during a time period, T; and
   determining a presence of one or two modes based on a distribution of the plurality of RTT measurements, and:
      determining a corrected RTT based at least in part on the plurality of RTT measurements and a first SIFS when there is only one mode; and
      determining a corrected RTT based at least in part on the plurality of RTT measurements, the first SIFS, and a SIFS offset Δ when there are two modes.

2. The method of claim 1, wherein the SIFS offset Δ is based at least in part on a difference between the two modes and on an average of previously determined SIFS offsets when there are two modes.

3. The method of claim 1, wherein, when there is only one mode and when |RTTpeak−Ts−TOF|<| RTTpeak−Ts−Δ−TOF, then the corrected RTT is determined as RTTpeak−Ts, and otherwise, then the corrected RTT is determined as RTTpeak−Ts−Δ, where RTTpeak is a peak RTT of the one mode, Ts is an offset corresponding to the first SIFS, A is the SIFS offset, and TOF is a time of flight.

4. The method of claim 1, wherein determining the corrected RTT includes minimizing a sum of squared residuals, each squared residual being based at least in part on a difference between an RTT; and a total travel time, the total travel time being based at least in part on a target location parameter, a, determined by setting a gradient of the sum of squared residuals to zero.

5. The method of claim 4, wherein a residual $R(rtt)_i$ is based at least in part on calculating $R(rtt)_i=[(RTT_i-\alpha^{OFF})+TOFi]$, where the subscript i denotes an $i^{th}$ RTT measurement of the plurality of RTT measurements and an $i^{th}$ time of flight $TOF_i$, and $\alpha^{OFF}$ is determined as Ts when there is only one mode and $\alpha^{OFF}$ is determined as Ts−Δ when there are two modes.

6. The method of claim 1, wherein, when there are two modes, the corrected RTT is determined as $RTT_{peak}-\alpha^{OFF}$, where $\alpha^{OFF}$ is equal to Ts for a first mode of the two modes and $\alpha^{OFF}$ is equal to Ts−Δ for a second mode of the two modes.

7. The method of claim 6, further comprising determining whether to use $\alpha^{OFF}$=Ts or $\alpha^{OFF}$=Ts−Δ for corrected RTT determination is based at least in part on a numerical fitting process.

8. The method of claim 1, wherein determining the presence of the one or two modes based on the distribution of the plurality of RTT measurements comprises producing a probability density function (PDF) of the plurality of RTT measurements.

9. The method of claim 8, wherein the PDF is produced using one of a window function or a kernel density estimation (KDE).

10. The method of claim 1, wherein the time period T is selected to be less than the SIFS offset Δ.

11. A first wireless device (WD) configured to determine a corrected round trip time (RTT) resulting from communication with a second WD, the second WD being configured with one or two short interframe spacings (SIFS), the first WD being configured to:
    perform a plurality of RTT measurements ($RTT_i$) at successive times during a time period, T; and
    determine a presence of one or two modes based on a distribution of the plurality of RTT measurements, and:
       determine a corrected RTT based at least in part on the plurality of RTT measurements and a first SIFS when there is only one mode;
       determine a corrected RTT based at least in part on the plurality of RTT measurements, the first SIFS, and a SIFS offset Δ when there are two modes.

12. The first WD of claim 11, wherein the SIFS offset Δ is based at least in part on a difference between the two modes and on an average of previously determined SIFS offsets when there are two modes.

13. The first WD of claim 11, wherein, when there is only one mode and when |RTTpeak−Ts−TOF|<|RTTpeak−Ts−Δ−TOF|, then the corrected RTT is determined as RTTpeak−Ts, and otherwise, then the corrected RTT is determined as RTTpeak−Ts−Δ, where RTTpeak is a peak RTT of the one mode, Ts is an offset corresponding to the first SIFS, A is the SIFS offset, and TOF is a time of flight.

14. The first WD of claim 11, wherein determining the corrected RTT includes minimizing a sum of squared residuals, each squared residual being based at least in part on a difference between an $RTT_i$ and a total travel time, the total travel time being based at least in part on a target location parameter, α, determined by setting a gradient of the sum of squared residuals to zero.

15. The first WD of claim 14, wherein a residual R(rtt); is based at least in part on calculating $R(rtt)_i=[(RTT_i-\alpha^{OFF})+TOFi]$, where the subscript i denotes an $i^{th}$ RTT measurement of the plurality of RTT measurements and an $i^{th}$ time of flight $TOF_i$, and $\alpha^{OFF}$ is determined as Ts when there is only one mode and $\alpha^{OFF}$ is determined as Ts−Δ when there are two modes.

16. The first WD of claim 11, wherein, when there are two modes, the corrected RTT is determined as RTTpeak−$\alpha^{OFF}$, where $\alpha^{OFF}$ is equal to Ts for a first mode of the two modes and $\alpha^{OFF}$ is equal to Ts−Δ for a second mode of the two modes.

17. The first WD of claim 16, wherein the first WD is configured to determine whether to use $\alpha^{OFF}$=Ts or $\alpha^{OFF}$=Ts−Δ for corrected RTT determination is based at least in part on a numerical fitting process.

18. The first WD of claim 11, wherein determining the presence of the one or two modes based on the distribution of the plurality of RTT measurements includes producing a probability density function (PDF) of the plurality of RTT measurements.

19. The first WD of claim 18, wherein the PDF is produced using one of a window function or a kernel density estimation (KDE).

20. The first WD of claim 11, wherein the time period T is selected to be less than the SIFS offset Δ.

* * * * *